US008844811B1

(12) United States Patent
Rogers et al.

(10) Patent No.: US 8,844,811 B1
(45) Date of Patent: Sep. 30, 2014

(54) SYSTEM AND METHOD FOR CONTROLLING LOCKS

(71) Applicants: April Elizabeth Rogers, Atlanta, GA (US); David Bohn, Mosinee, WI (US)

(72) Inventors: April Elizabeth Rogers, Atlanta, GA (US); David Bohn, Mosinee, WI (US)

( * ) Notice: Subject to any disclaimer, the term of this patent is extended or adjusted under 35 U.S.C. 154(b) by 0 days.

(21) Appl. No.: 13/734,567

(22) Filed: Jun. 4, 2013

(51) Int. Cl.
*G06K 5/00* (2006.01)
*G07C 9/00* (2006.01)

(52) U.S. Cl.
CPC ........ *G07C 9/00182* (2013.01); *G07C 9/00904* (2013.01)
USPC .... 235/382; 235/487; 235/382.5; 235/462.09

(58) Field of Classification Search
CPC .......... G07C 9/007; G05B 1/01; G06Q 10/06; G06Q 10/08
USPC .......................... 235/382, 487, 382.5, 462.09
See application file for complete search history.

(56) References Cited

U.S. PATENT DOCUMENTS

2003/0121968 A1* 7/2003 Miller et al. .................. 235/375
2004/0099026 A1* 5/2004 Nunez ............................. 70/283
2010/0045464 A1* 2/2010 Knopf et al. ............... 340/573.1
2011/0313893 A1* 12/2011 Weik, III .......................... 705/28
2012/0280790 A1* 11/2012 Gerhardt et al. ............. 340/5.61
2013/0008958 A1* 1/2013 Smith et al. .................... 235/382
2013/0221094 A1* 8/2013 Smith et al. .................... 235/382
2013/0257590 A1* 10/2013 Kuenzi et al. ................ 340/5.65

* cited by examiner

*Primary Examiner* — Edwyn Labaze

(57) ABSTRACT

A system and method for opening locks, primarily door locks like the locks on hotel room doors using a handheld mobile device and a QR code. A mobile user can be provided with a QR code either via email or from a mobile phone application (App.). The QRC will be their room key. The handheld mobile device will display the QRC on its display. A QRC scanner is connected to the door lock through a processor that can decode the QRC. The processor sends a command to the door lock to open when the proper QRC is decoded.

15 Claims, 2 Drawing Sheets

SYSTEM AND METHOD FOR CONTROLLING LOCKS

BACKGROUND

1. Field of the Invention

The present invention relates to controlling locks and more particularly to a system and method for controlling and opening locks with a QR code (QRC).

2. Description of the Problem

There are numerous locks on doors like hotel rooms that are opened with either metal keys or with programmed plastic cards. It would be advantageous to have a system and method that could open a door lock, such as the lock on a hotel door, using a QR code displayed on a handheld device like a mobile phone.

SUMMARY OF THE INVENTION

The present invention relates to a system and method for opening locks, primarily door locks like the locks on hotel room doors using a handheld mobile device and a QR code. A mobile user can be provided with a QR code either via email or from a mobile phone application (App.). The QRC will be their room key. The handheld mobile device will display the QRC on its display. A QRC scanner is connected to the door lock through a processor that can decode the QRC. The processor sends a command to the door lock to open when the proper QRC is decoded.

DESCRIPTION OF THE FIGURES

Attention is now directed to several drawings that illustrate features of the present invention.

Several drawings and illustrations have been presented to aid in understanding the present invention. The scope of the present invention is not limited to what is shown in the figures.

DESCRIPTION OF THE PREFERRED EMBODIMENTS

Figure 1:
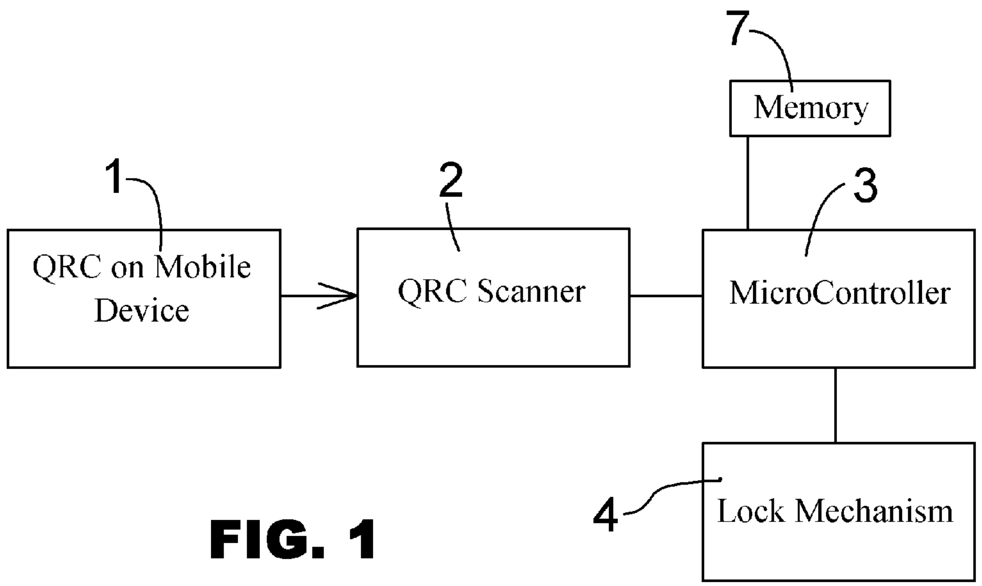
FIG. 1 shows a block diagram of the functioning of the present invention.

Turning to FIG. 1, a block diagram of the present invention can be seen. A mobile device 1 such as a smartphone presents a displayed QRC to a scanner 2 associated with a door. A microcontroller 3 or other processor controls a lock mechanism 4 that can unlock the door. The QRC is obtained by the mobile device by email, by an App that resides on the smartphone, or by any other means. In general, the QRC scanner can be separate or integrated with the processor.

The QR code itself will typically be determined by the end client to conform with the client's security requirements. The end client might be a business such as a hotel or chain of hotels or motels. The QR code can be managed and generated by third party private servers maintained by the end client or its agents. One example of a QR code is as follows: 1) The check-in date is encoded by two 64 bit encoded characters. These two characters can start at the date of the first implementation and run for a long time period (10 years for example). After the time period has run out, the date key can be reused. 2) The check-out date can be encoded by two more 64 bit encoded characters. The check-out data characters can also run for the same (or different) time period as the check-in date. 3) A four character (or other number) key can uniquely identify the lock for that matches that key. A particular scanner/lock mechanism can be supplied with a table of changing unique identifiers stored in memory and accessible to a processor that are assigned to that lock for a particular period based on the check-in date or on other criteria. The scanner can query this table to determine if the particular key is correct for the particular lock. This table can be optionally updated over a network. The network can optionally be wireless.

Scanner

The scanner can autonomously detect and decode a QR code from a mobile device display. The QRC can be read and examined by programming in the scanner device. The scanner can be supplied with a table that can be queried to determine the current unique identifier for that door. A particular QR code will usually remain stable and valid from check-in to check-out. When the scanner detects a valid key, a signal can be sent to a processor or directly to a lock mechanism to open the door.

Processor

The preferred processor is a microcontroller; however, any processor is within the scope of the present invention including a remote processor accessed over a network. Typically, communication between the scanner and the processor can be handled through standard available general purpose input/output ports (GPIO). When the processor receives an open command from the scanner, the processor will typically do the following:

A. Send a port command to the lock mechanism to cause it to unlock. The communication between the lock and the processor may need to go through an interface circuit such as an H-bridge depending on the specifications of the lock mechanism. B. Verify that the lock has been opened. C. Wait for a predetermined time, and then re-engage the lock.

Scanner/Processor Configurations

Figure 2:
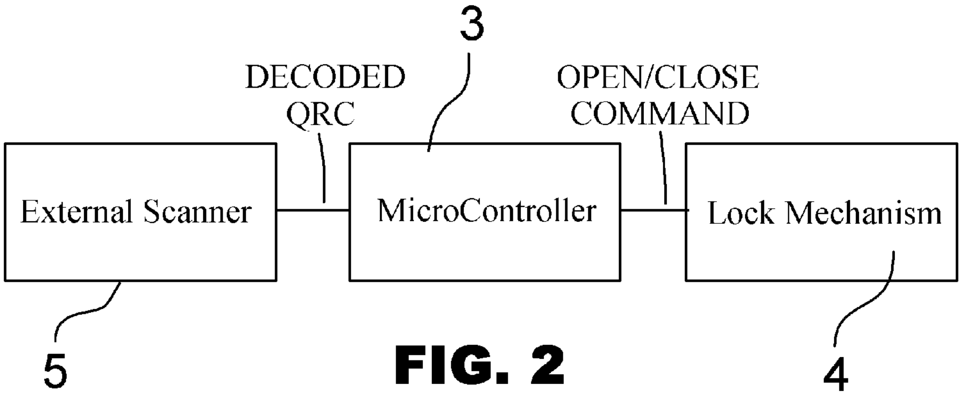
FIG. 2 shows a block diagram of a first embodiment that uses a standalone scanner.

The scanner and processor can be set up in several different configurations:

According to FIG. 2, an external standalone scanner 5 (which can be a 3-D barcode scanner, smartphone or a specially designed QRC scanner) can be used and attached to a processor 3 by any connection technique (such as hardwire, USB, modem FSK, ASK or other, other serial port, direct GPIO link or by any other connection. In this embodiment of the invention, the scanner is responsible for decoding the QRC and sending an open signal to the processor 3 if it has determined that the lock mechanism 4 should open the lock. The processor 3 in this embodiment will handle interfacing with the lock mechanism 4.

Figure 3:
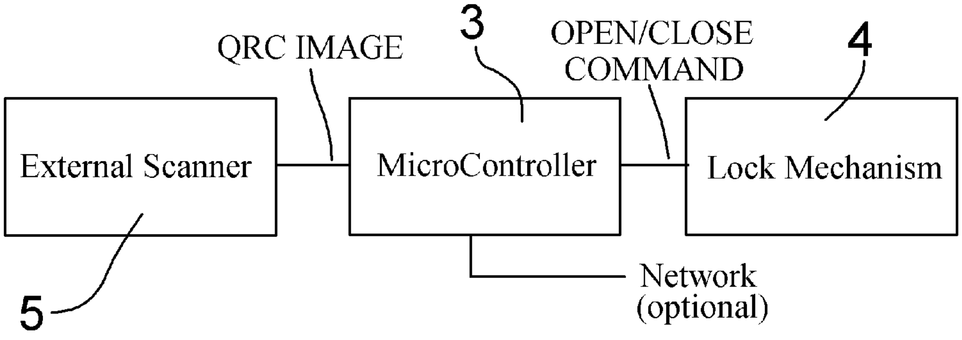
FIG. 3 shows a block diagram of a second embodiment that transmits the QRC image to a processor for decoding.

According to FIG. 3 an external standalone scanner 5 (which can be a 3-D barcode scanner, smartphone or a specially designed QRC scanner) can be used and attached to a processor 3 by any connection technique (such as hardwire, USB, modem FSK, ASK or other, other serial port, direct GPIO link or by any other connection just as in FIG. 2. However, in this embodiment, the processor 3 is responsible for taking the decoded QRC and making a decision on whether this is the correct key or not, and whether the door should be opened. If the key is correct, the processor 3 notifies the lock mechanism 4 to open. The processor 3 may be in communication with a remote information source where data on the current QRC for this lock can be downloaded. This download may be over a network.

Figure 4:
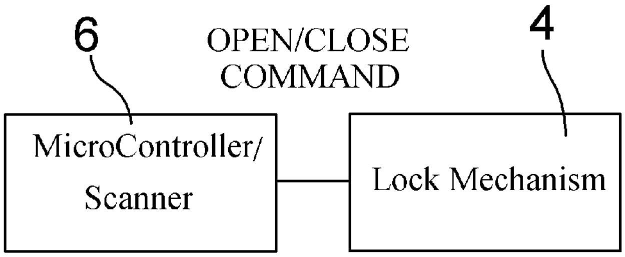
FIG. 4 shows a block diagram of a third embodiment where the processor is combined with the scanner.

According to FIG. 4, the scanner and processor can be one integrated unit 6 that performs the QRC decode, determines if the key is correct for the lock and orders the lock mechanism 4 to open.

In all of the embodiments, whether a QR code is valid can be based on the fact that the current date lies between a check-in date and a check-out date. A valid QR code can also be based on whether a guest has actually checked in and whether the guest has actually checked out. Data to this effect can be sent to the processor that checks criteria on whether a particular QR code key should be allowed to open a particular door or not. Data can be sent from a hotel computer or other remote source the processor over a network wired or wireless.

The present invention also allows for the use of maids' keys and/or master keys. These can be special QR codes that each QR scanner or processor can recognize. These can be changed on command by the client or automatically on a periodic basis. Typically a master QR code key will be recognized by many different locks.

It should be noted that while examples of the present invention have been given in relation to doors at facilities like hotels, any lock anywhere can be controlled using the present invention. Any part of the system might be remote and communication between parts of the system could take place over a network such as the Internet or over a private network. Remote communication can be encrypted for further security.

It should also be noted that the choice of a particular QR code for a particular lock on a particular day or at a particular time can be made according to numerous different methods. While check-in, check-out in relation to hotel room locks has been given as an example, any method or technique for assigning a QR code to a particular lock at a particular date and/or time is within the scope of the present invention. Also, any method for decoding a presented QR code and sending a command directly or indirectly to a lock or lock mechanism is within the scope of the present invention.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A system for controlling a door lock comprising: a QR scanner in communication with a processor, said processor having access to memory, said memory storing a current date and time, said processor in communication with a door lock mechanism adapted to open said door lock; a set of executable instructions executing in said processor; a table stored in said memory, said table containing at least one particular QR code currently valid for said door lock; said one particular QR code including at least a check-in date, a check-out date and a lock ID; said executable instructions configured to compare QR codes received at said QR scanner with QR codes stored in said table, QR codes received at the QR scanner displayed on a handheld device by a user, said user having received at least one QR code on said handheld device by email or by photographing it, and upon finding a match between a QR code received a the QR scanner and said one particular QR code, verifying that the current date and time are between the check-in date and the check-out date, and that the lock ID matches a stored lock ID for said door lock, said processor upon successfully performing said verifying, configured to send a command to said door lock mechanism to open said door lock; said executable instructions also configured to verify that said lock has opened, and to send a command to said door lock mechanism to re-lock after a predetermined period.

2. The system of claim 1 wherein said table contains valid QR codes based on check-in dates and check-out dates.

3. The system of claim 1 further comprising a network interface.

4. The system of claim 3 wherein said QR codes stored in the table can be updated from a remote location via said network interface.

5. The system of claim 1 wherein said processor is a microcontroller.

6. The system of claim 1 wherein said QR scanner and said processor are a single unit.

7. The system of claim 1 wherein said QR scanner is adapted to scan a QR code from a handheld mobile device.

8. The system of claim 7 wherein said handheld mobile device receives the QR code by email.

9. The system of claim 7 wherein said handheld mobile device receives the QR code by photographing it using an internal camera.

10. The system of claim 1 further comprising a special master QR code recognized by a plurality of door locks and a plurality of maid QR codes assignable to a plurality of individuals, wherein said processor further executes instructions configured to recognize the master QR code and the maid QR codes ignoring the lock ID field in said master and maid QR codes.

11. The system of claim 1 further comprising a special master QR code recognized by a plurality of door locks and a plurality of maid QR codes assignable to a plurality of individuals, wherein said processor further executes instructions configured to recognize the master QR code and the maid QR codes allowing access if the lock ID belongs to a predetermined set of locks.

12. A method for controlling door locks comprising: sending a guest QR code to a guest handheld mobile device at check-in to a hotel either via email or by allowing the guest handheld mobile device to photograph the guest QR code; sending a particular maid QR code to a maid handheld mobile device either by email or by allowing the second handheld mobile device to photograph the maid QR code; allowing the guest or maid handheld mobile device to display said QR code to a QR scanner located in proximity to a hotel room door lock; causing the hotel room door lock to open by recognizing the guest QR code and comparing a stored check-in date, a check-out date and a lock ID with a check-in date, check-out date and lock ID coded into said guest QR code; causing the hotel room door lock to open by recognizing the particular maid QR code and comparing a stored valid date to a current calendar date; causing said hotel room door to re-lock a predetermined period of time after is unlocks.

13. The method of claim 12 further comprising sending a master QR code to a master handheld mobile device either by email or by allowing the master handheld mobile device to photograph the master QR code;

allowing the master handheld mobile device to display said master QR code to a QR scanner located in proximity to a hotel room door lock;

causing the hotel room door lock to open by recognizing the master QR code.

14. The method of claim 12 wherein said QR scanner includes a processor adapted to look up stored QR codes from a table.

15. The method of claim 12 further comprising causing said hotel room door to re-lock a predetermined period of time after is unlocks.

* * * * *